United States Patent Office 3,533,824
Patented Oct. 13, 1970

3,533,824
ALUMINUM COATED SILICEOUS PARTICLES,
METHODS AND COMPOSITES
James R. Terrill, Natrona Heights, and Stanley F. Dzierski, Arnold, Pa., assignors to Aluminum Company of America, Pittsburgh, Pa., a corporation of Pennsylvania
No Drawing. Filed Apr. 5, 1967, Ser. No. 628,547
Int. Cl. B23p 3/00; C03c 17/06
U.S. Cl. 117—22       11 Claims

ABSTRACT OF THE DISCLOSURE

Siliceous particles, such as glass or sand, can be coated with aluminous metal by immersion in a melt containing aluminum, 1 to 8% magnesium, and optionally, 10 to 12% silicon. The coated particles can then be joined to a metallic substrate, conveniently one having a surface layer of aluminum joining alloy.

---

This invention relates to coating siliceous particles with aluminous metal, the coated particles and composite articles embodying the coated particles. In accordance with the invention, such coated particles are produced by immersing the particles in a melt of aluminum containing 1 to 8% magnesium, and optionally, 10 to 12% silicon. In a preferred embodiment, the particles, larger than 100 mesh in size, are dried and preheated to a temperature of at least 900° F., and then added gradually to the melt and immersed therein to form a mixture containing substantially equal weight portions of particles and melt. The mixture is then cooled through the freezing range of the melt with continuous stirring. After the temperature has gone below the solidus point, the stirring is terminated and the particles have a uniform aluminous coating. Each particle is individually coated with aluminous metal, as opposed to being agglomerated into larger pieces of gritty aluminous metal, even though produced in bulk form by the method described.

The coated particles can then be fusion joined to each other or to another metallic surface or substrate by soldering, brazing or the like. The joint may be effected by fusion of a joining alloy, or filler metal, such as the known aluminum base brazing alloys or soldering alloys which may be provided as a surface layer clad to a metal substrate. Joining is accomplished by melting the joining alloy, contacting the coated non-metallic particles therewith, and solidifying the joining alloy.

A particularly useful embodiment of the invention contemplates the individual coating of sand particles which are then fusion joined to a metal substrate, preferably an aluminum alloy, to provide a composite with a highly durable anti-skid surface.

A further understanding of the invention will proceed from the following detailed description in exemplification thereof.

The invention is applicable to coating, with an aluminum alloy, siliceous particles typified by glass or silica beads or particles, sand, and the like. The particle size used in practicing the invention varies considerably depending, inter alia, on the purpose to be served by the coating and the intended use of the coated particles. One important limitation on particle size is that the particles not be finer than 100 mesh size on the Tyler Standard Screen Series, i.e. the particles should not pass through a 100 mesh screen, since finer particles are excessively consumed by reaction with the melt. The particles can vary from this rather fine condition to pea size or gravel consistency, or even larger sizes. Sand or other siliceous particles falling within the mesh range of −8+50, preferably −20+30, are especially suited for coating by the improved method. The size of the coated particles may vary from the size before the coating in that an initial sand particle size of −20+30 results in coated sand particles 60% of which fall within the mesh range of −12+50.

Turning to the composition of the immersion melt, it contains, by weight, 1 to 8% magnesium, preferably 4 to 6%. In addition, it is often advisable that the melt also contain 10 to 12% silicon. The latter addition lowers the melting point of the melt and may serve as an aid to any subsequent brazing of the particles, where such is contemplated. The melt may also contain other alloying constituents and incidental elements and impurities normally associated with aluminum.

The particles should be cleaned to remove any surface oil, dirt, or the like, prior to being coated. The particles are preferably preheated prior to immersion to avoid excessively cooling the melt and to remove surface moisture which could present a safety hazard and also impair and coating process. Thus in practicing the invention, it is preferable to preheat the siliceous particles to a temperature of at least 900° F., preferably 1000° F. or higher. This preheating can be accomplished by any suitable means such as baking in an oven. If desired, drying can be accomplished in a separate step at a lower temperature, e.g. 400° F., after which the dried particles are heated to 900° F. or more.

The dry particles are added to the melt gradually, preferably in a slow pouring stream, to avoid any clustering which would tend to retard each particle from being individually contacted and wetted by the melt. To illustrate, adding two pounds of −20+30 mesh sand might take 10 to 15 minutes. The particles may be added until their weight substantially equals half the total weight of the sand-melt mixture. More particularly, the siliceous particles are added in sufficient quantity to provide a particle-melt mixture containing ¾ to 1¼ part molten metal per part of the siliceous particles, by weight, although substantially equal portions are preferred. While the particles are being added, it is advisable to avoid any significant solidification in the melt since such would impair the initial wetting of the particles. The preheat of the particles described above is helpful in this respect although in some cases additional heat may be needed to properly maintain the fluidity of the melt.

After the desired particle-melt mixture is achieved, the melt may be allowed to stand for a period of time, preferably 5 to 10 minutes, or longer, to assure thorough melt contact with the particle surfaces and to allow for completion of any reaction which may occur between the melt and the particle surfaces. The temperature of the melt will often increase by 50° to 150° F. because of an exothermic reaction whereby some amount of the siliceous particle material is chemically reduced with the evolution of some heat.

The melt mixture is then cooled through the freezing range of the melt. By freezing range is meant that temperature gradient between the liquidus and solidus temperatures of the melt. It is in this range that care must be exercised to avoid agglomeration of the particles with entrained melt, which would result in agglomerates of gritty aluminous metal. The desired individual coating of the particles is achieved by continuously stirring or tumbling the mixture as the temperature is lowered through the freezing range. In this range the metal tends to exhibit a plastic characteristic wherein, as the temperature decreases, the metal gets progressively thicker. If the particle-melt mixture is tumbled about by stirring, the individual coated sand particles tend to remain free, even in bulk, as opposed to agglomerating. The stirring action should be such as to cause the individual particles to move relative to each other; that is, to maintain motion of the individual particles in the mixture. Stirring can be accomplished in various fashions depending, inter alia, the size of the melt and the type of receptacle employed to contain the melt. For instance, one or more graphite paddles can be employed in an open top crucible. After the temperature has been lowered below the solidus point, the need for stirring is obviated since the metallic coating is solidified. For melts containing aluminum, 1 to 8% magnesium and 10 to 12% silicon, the freezing range is between about 1120° and 1020° F.

It is preferable that the melt be cooled through its freezing range in a vessel which is not wetted by the melt. It is also preferable that any stirring paddles, or the like, also be fashioned from a material which is not wetted. Graphite serves this purpose well, although other materials would also prove useful. It is often helpful to transfer the melt-particle mixture to a different container, one having a lower temperature, than the original melt vessel. The advantage is a more rapid transition through the freezing range and less duration of stirring. For instance, in a vessel containing a melt-particle mixture at 1130° F., it may require an hour or more for the entire melt to be cooled through its freezing range. Transferring this melt to a vessel at room temperature will decrease this time to a few minutes, an obvious time economy. It is also preferable in practicing the invention to avoid the use of chlorine containing flux or other conditions which might introduce chlorine to the melt, since such retards the coating action.

Summarizing, the particles are gradually added at some melt temperature above the liquidus temperature, for instance 1150° F., until a mixture of substantially equal weight portions, melt and particles, is achieved. This mixture is then cooled through the freezing range with continuous stirring to produce individually coated particles, each having a substantially uniform solid aluminum alloy coating thereon. In practicing the invention a 95% recovery level is typical. That is, 95% of the sand or other siliceous particles added to the melt are recovered as individually coated particles. The balance, typically around 5%, is lost in the form of a gritty agglomerate shot.

The composition of the aluminum alloy coating is similar to, but may deviate somewhat from, that of the melt since siliceous materials are generally somewhat reactive with molten aluminum. The extent of the reaction depends on temperature, time, and other factors known to influence such. For instance, in coating sand employing a preferred melt containing aluminum, 4 to 6% magnesium and 10 to 12% silicon, the coating on the individual sand particles contains substantially less magnesium, generally about 1 to 2% Mg, but higher silicon, about 15% Si. The magnesium content of the coating generally falls within the range of ½ to 8% although it is ordinarily less than that of the melt. Where the immersion melt contains silicon, the coating will also include some amount thereof, although some silicon will usually be present in the coating even if the bath is substantially free of silicon. The coating generally contains from 1 to 20% silicon.

The bond between the aluminum alloy coating and the siliceous particles is quite tenacious, which is most probably attributable to some sort of chemical reaction. The coated particles may be useful as produced although the adherence of the coating permits joining to other metallic surfaces, for instance on aluminum substrate, by joining metal fusion processes such as brazing, soldering, or the like. The joining practices referred to are those wherein two or more members are joined by melting a joining alloy (without melting the members being joined) and then solidifying the joining alloy to provide a metal bond connecting the members.

The joining alloy may be any of the known brazing or soldering alloys adapted to joining aluminum members. An aluminum brazing alloy is generally an aluminum base alloy which melts at a lower temperature than the aluminum members being joined. There are various such alloy compositions which for the most part comprise aluminum and about 4 to 13% silicon. In some cases substantial amounts of copper or zinc may also be included. As is known, aluminum brazing filler alloys are available in various forms, including wire and brazing sheet. Examples of suitable brazing sheet products comprising an aluminum alloy core and an integral layer of aluminum brazing joining alloy are provided by the disclosure of U.S. Pat. 2,312,039. By way of illustration, brazing sheets commercially available include aluminum brazing joining metal cladding containing 7.5 or 10% silicon and a core layer of aluminum alloy 3003 (Al 1.2% Mn) or alloy 6951 (Al 0.25% Cu, 0.35% Si, 0.65% Mg). The cladding normally constitutes 5 to 10% of the total thickness.

The joining metals adapted to joining aluminum surfaces by soldering are generally composed of zinc or zinc alloyed with about 5% aluminum. Such alloys melt around 700° to 800° F. and are often referred to as "high" temperature solders. Lower melting solders are composed primarily of tin, lead, cadmium and bismuth. These solders melt at much lower temperatures, below 500° F. Soldering, of course, offers the advantage of a lower joining temperature than brazing. For purposes of this description, the term joining alloy is intended to include brazing alloys, soldering alloys, and the like, which fuse to form a joint at a temperature below the melting temperature of the members being joined.

An aluminum substrate can be provided with a layer of joining alloy by metal spraying techniques or any other method of providing a bonded layer. This provides a composite comprising an integral layer of joining alloy and an aluminum substrate which can be used in the same fashion as aluminum brazing sheet, which itself is useful in practicing the invention. Aluminous coated siliceous particles as provided herein may be joined to an aluminous substrate or even a non-aluminous metal substrate by the above-described joining methods. For instance, it is known that aluminum can be soldered to metals such as lead, zinc, tin, steel, brass, nickel and other metals. In practicing the invention, the aluminous coated siliceous particles can be soldered to substrates composed of these materials. Thus the invention contemplates joining the coated siliceous particles to substrates of aluminum or its alloys as a preferred practice, but contemplates, on a broader basis, joining to any metal substrate adapted to fusion joining to aluminum, particularly any metal substrate having a surface, e.g. an aluminum coating or cladding, adapted to fusion joining to aluminum.

In forming the joint between particles and substrate, the joining alloy is brought to joining temperature where it is melted but the particles and substrate being joined are not. For aluminum brazing this normally entails temperatures of about 1050° to 1150° F. In soldering, the temperature will vary according to whether the so-called "high" or the "low" temperature variety of solder joining alloy is employed. The coated particles, preferably preheated to within 100° F. of the joining temperature, are brought into contact with the molten joining alloy layer to allow molten alloy to wet and form a connection between the particles and the substrate. When the joining metal solidifies, it will form a solid connection constituting the joint. Before allowing the joining metal to solidify, it is advisable to agitate the particles so as to disturb the oxide film on the molten joining metal. This aids wetting of the particles by the joining alloy and can be accomplished by slightly rotating the particles as by passing a spatula over them.

EXAMPLE I

An example illustrating the invention is as follows. In a crucible holding 1000 grams of an alloy containing aluminum, 5% magnesium and 12% silicon, at 1200° F., is added 1100 grams of common river sand having a particle size falling in the range of —20+30 mesh. The sand, prior to introduction in the melt, is dried at 400° F. for one hour and then preheated to 900° F. The sand is added gradually over a period of 15 minutes, in a smooth-pouring, well-spread stream, so as to enhance each particle contacting the melt individually. This mixture, which has a pasty consistency, is maintained for 15 minutes during which period the temperature increases and is then transferred to a cold graphite crucible, at room temperature, and immediately stirred as it cools through its freezing range, which requires only about 3 minutes. The sand particles exhibit a uniform aluminous coating, and the run produces a recovery of 95% coated sand particles on the basis of the sand originally added. Most of the coated sand, over 60%, falls within the particle size range of —12+50 mesh.

EXAMPLE II

The coated particles described in Example I are applied to a substrate of the earlier described aluminum brazing sheet as follows. The brazing sheet is brought to brazing temperature, 1100° F., which melts the brazing filler alloy but not the substrate. The aluminous coated sand particles, preheated to a temperature of 1000° F., are then sprinkled on the molten brazing alloy. While the impact of the particles striking the molten alloy is often adequate to promote sufficient wetting thereof, such is further assured by mechanically disturbing the particles as by rotating or pressing them slightly with a graphite spatula. After the desired amount of coated sand is applied to the sheet and agitated slightly, the brazing alloy is cooled to allow solidification thereof. The coated sand is observed to adhere quite tenaciously to the substrate thus providing a highly useful and durable composite with an anti-skid surface.

EXAMPLE III

Some of the coated particles produced in Example I are joined to an aluminous substrate by soldering according to the following procedure. Aluminum alloy 7005 sheet, about ⅛ inch, is metalized with an aluminum alloy 1100 barrier layer about 0.004 inch thick and then metalized with an aluminum solder alloy layer about 0.008 inch thick and containing 95% zinc and 5% aluminum. The barrier layer serves to retard diffusion of the joining alloy constituents into the 7005 alloy sheet substrate. The metalizing technique is that normally used in the art wherein the metal coating is sprayed on the substrate according to known procedures. The aluminous coated sand is then spread evenly over the soldering alloy layer and then the sheets are heated in a furnace. When the solder becomes liquid, at 720° to 750° F., the particles are agitated slightly with a spatula made of refractory insulating material. This serves to break up the oxide film on the molten solder and facilitates extremely effective wetting of the aluminous coated sand particles. The sheets are allowed to cool thus solidifying the solder alloy. Composite sheets so produced exhibit a highly adherent and tenacious coating of sand which provides an extremely durable anti-skid surface.

The invention contemplates producing a composite comprising siliceous particles each individually provided with an aluminous coating and joined by a fused joining alloy such as aluminum brazing or soldering alloys to a substrate having a surface adapted to aluminum fusion joining practices herein described, preferably an aluminum alloy surface.

What is claimed is:

1. A method of coating siliceous particles with aluminous metal comprising:
    (1) providing a melt of an aluminum base alloy consisting essentially of aluminum and 1 to 8% magnesium, the melt being at a temperature not lower than its liquidus temperature,
    (2) providing dry siliceous particles having a size not finer than that which will pass a 100 mesh screen,
    (3) gradually adding said siliceous particles to said melt and immersing the same therein to form a mixture containing ¾ to 1¼ part molten metal per part of said particles, by weight, while avoiding any substantial solidification of said melt,
    (4) cooling said mixture through the freezing range of said melt while continuously stirring said mixture to cause individual particles to move relative to one another thereby producing in bulk form individual siliceous particles coated with aluminous metal.

2. The method according to claim 1 wherein the melt contains 4 to 6% magnesium and the siliceous particles are heated to a temperature of at least 900° F. prior to being added to the melt.

3. The method according to claim 2 wherein the melt contains, in addition to said magnesium, 10 to 12% silicon.

4. The method according to claim 2 wherein the siliceous particles are sand having a particle size falling within the range —20+30 mesh.

5. The method according to claim 1 wherein the particle-melt mixture is allowed to stand for a period of 5 to 30 minutes while avoiding any substantial solidification thereof prior to being cooled.

6. The method according to claim 5 wherein the mixture contains substantially equal parts of particles and melt.

7. The method of producing a composite having aluminous metal coated siliceous particles metal fusion joined to a metallic substrate comprising:
    (1) providing a melt of an aluminum base alloy consisting essentially of aluminum and 1 to 8% magnesium, the melt being at a temperature not lower than its liquidus temperature,
    (2) providing dry siliceous particles having a size not finer than that which will pass a 100 mesh screen,
    (3) gradually adding said siliceous particles to said melt and immersing the same therein to form a mixture containing ¾ to 1¼ part molten metal per part of said particles, by weight, while avoiding any substantial solidification of said melt,
    (4) cooling said mixture through the freezing range of said melt while continuously stirring said mixture to cause individual particles to move relative to one another, thereby to produce in bulk form individual siliceous particles coated with aluminous metal,
    (5) providing a metallic substrate having a surface layer of aluminum joining alloy thereon,
    (6) bringing said joining alloy layer to joining temperature,
    (7) bringing the aluminum metal coated siliceous particles into contact with said joining alloy layer so as to be wetted thereby and
    (8) solidifying said joining alloy.

8. The process according to claim 7 wherein said particles, after being brought into contact with said joining alloy layer, are agitated to promote wetting thereof by said joining alloy.

9. Aluminous metal coated siliceous particles in bulk form comprising siliceous core particles substantially uniformly coated with an alloy consisting essentially of aluminum, ½ to 8% magnesium and 1 to 15% silicon.

10. The coated particles according to claim 9 wherein said siliceous particles are sand and the coating contains 1 to 2% magnesium.

11. A composite article comprising a metallic substrate having a surface layer of fused aluminum joining alloy and a plurality of siliceous particles each coated with aluminous metal consisting essentially of aluminum, ½ to 8% magnesium and 1 to 15% silicon, said fused joining alloy connecting said particles to said substrate.

(References on following page)

References Cited

UNITED STATES PATENTS

| | | | |
|---|---|---|---|
| 2,896,278 | 7/1959 | Wasserback | 117—100 X |
| 2,990,807 | 7/1961 | Gerow | 117—100 X |
| 3,139,553 | 6/1964 | Schwartzwalder | 117—100 X |
| 3,202,533 | 8/1965 | Sachsel et al. | 117—100 X |
| 3,222,218 | 12/1965 | Beltzer et al. | 117—100 X |
| 3,255,036 | 6/1966 | Kramer et al. | 117—100 |
| 3,398,012 | 8/1968 | Parkes et al. | 117—100 |
| 3,445,260 | 5/1969 | Peter | 117—100 X |

WILLIAM D. MARTIN, Primary Examiner

P. F. ATTAGUILE, Assistant Examiner

U.S. Cl. X.R.

29—197; 117—27, 100